United States Patent
Kruse

[11] Patent Number: 5,877,415
[45] Date of Patent: Mar. 2, 1999

[54] LAMINAR AIRFLOW DETECTOR

[76] Inventor: Lars Kruse, 110 West 67th Ter., Kansas City, Mo. 64113

[21] Appl. No.: 963,320

[22] Filed: Nov. 3, 1997

[51] Int. Cl.[6] ..................................................... G01W 1/00
[52] U.S. Cl. ..................................... 73/170.03; 73/170.06
[58] Field of Search ........................... 73/170.03, 170.06, 73/147; 340/601

[56] References Cited

U.S. PATENT DOCUMENTS

| | | | |
|---|---|---|---|
| 3,395,577 | 8/1968 | Keim | 73/170.03 |
| 3,654,807 | 4/1972 | Deskey | 73/180 |
| 3,763,703 | 10/1973 | Man | 73/182 |
| 3,789,793 | 2/1974 | Keim | 116/114 R |
| 3,799,106 | 3/1974 | Lamport | 116/28 R |
| 3,815,412 | 6/1974 | Keim | 73/170.03 |
| 4,027,533 | 6/1977 | Pretto | 73/170.03 |
| 4,223,631 | 9/1980 | Poad | 116/265 |
| 4,410,382 | 10/1983 | Varela | 73/147 |
| 4,437,425 | 3/1984 | Unden | 114/102 |
| 5,415,121 | 5/1995 | Corlett | 114/102 |
| 5,477,424 | 12/1995 | Mocha | 362/32 |

*Primary Examiner*—Ronald Biegel
*Attorney, Agent, or Firm*—Spencer Fane Britt & Browne LLP

[57] ABSTRACT

A detector is provided to determine the presence and absence of laminar airflow on the face of an airfoil or sail or surface and to transmit and signal the airflow condition to a user who is at a distance from the sail or surface to thereby allow the user to adjust the condition or position of the sail or airfoil in order to establish laminar airflow across the sail or airfoil or surface.

13 Claims, 2 Drawing Sheets

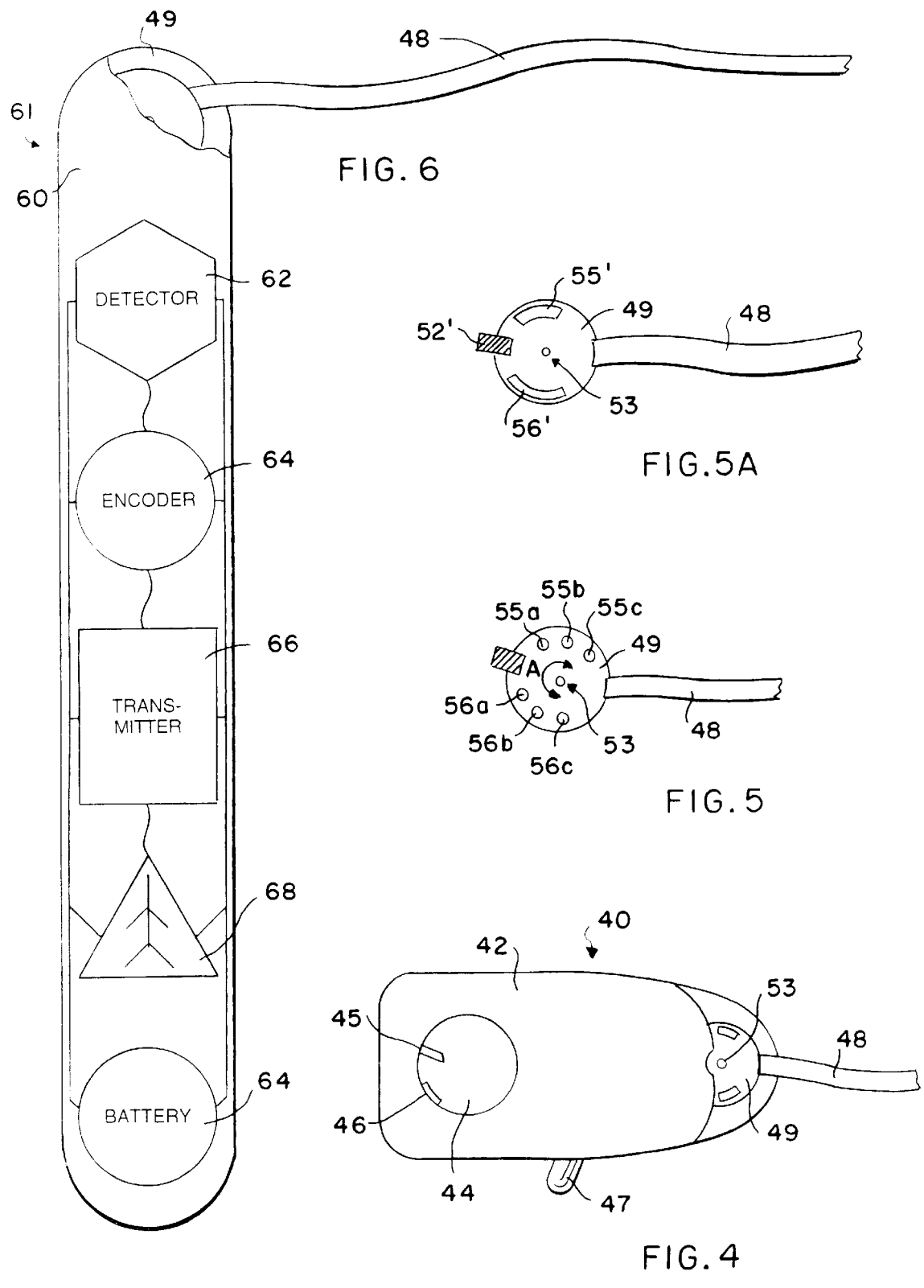

LAMINAR AIRFLOW DETECTOR

BACKGROUND OF THE INVENTION

This invention relates to an indicator which may be attached to the sails of a sailing vessel in order to allow the determination by a sailor that laminar flow of air across the sail's surface is achieved. Laminar airflow creates a negative pressure on the leeward side of the sail and the pressure differential is in turn translated by the hull of the boat into a forward motion.

Various indicators have been developed to allow the determination that the sail is properly trimmed in order to achieve laminar flow of air across the sail. One such apparatus is taught in U.S. Pat. No. 3,763,703 in which a device having air pressure sensors is utilized to measure and compare the pressures on either side of the sail so that the sail may be trimmed to provide a maximum pressure differential between the two sides of the sail. Another system, the subject of U.S. Pat. No. 3,654,807, teaches the use of a pair of temperature sensitive devices, such as thermistors, mounted on either side of the leading edge of an airfoil or sail and which detect the airflow differential resulting from the temperature differences created on either side of the sail by the differential airflow. In U.S. Pat. No. 4,236,409 an indicator for determination of optimum angular positioning of the sail is taught in which a wind vane is interconnected with a computer and angular display whereby the wind direction is determined and the computer determines and then presents to the sailor the proper direction to orient the sail to achieve the optimum angular position of the sail with respect to the wind.

The method of determination of laminar airflow across the sail which has been used for years by sailors is the device known as a "tell-tail". A tell-tail is simply a piece of string or cloth-like material such as nylon of approximately 5–10 inches in length and which is attached to the sail surface. Referring now to FIG. 1, the location of several tell-tails 10 may be seen attached to the sails of the boat in FIG. 1. When the sail is properly positioned with respect to the wind and laminar flow is achieved the tell-tails are caught in the air stream and are pushed directly backward in the direction of the wind as shown in FIG. 2c. The positioning of the tell-tail when non-laminar airflow is achieved is shown in FIGS. 2a and 2b. In these cases, laminar airflow is achieved on one side of the sail only, and the other side is presented with disturbed airflow. In the case of FIG. 2a laminar airflow is achieved on the far side of the sail and the tell-tail for that side, shown in phantom lines, is extending directly backward. On the near side of the sail, the airflow is disturbed in FIG. 2a and the tell-tail is being pushed upward by the turbulent airflow. In FIG. 2b the reverse situation of that illustrated in FIG. 2a is shown with the near side of the sail having laminar airflow as indicated by the tell-tail and the far side having disturbed airflow as indicated by the tell-tail shown in phantom lines. While the disturbed airflow tell-tail is shown as being pushed upwardly in both FIGS. 2a and 2b, the tell-tail can also hang downwardly when non-laminar airflow occurs.

It will be appreciated that in order to determine if laminar airflow is occurring across the sail, it is necessary to be able to see both sides of the sail and to determine whether or not both tell-tails are being forced directly backward as in the case of FIG. 2c. This backward streaming indicates that laminar airflow has been achieved on both sides of the sail. The practical circumstances of sailing do not always allow observation of the tell-tail by a sailor in the cockpit of the boat. For instance, should the sailor be caught in a squall the poor visibility due to the rain will prevent the sailor from observing both the tell-tails. Also, in the case of darkness, it would not be possible for the sailor to see that the tell-tails on either side of the sail were caught in laminar airflow. Finally, as a sailboat size increases, it is not possible for a single individual to be able to visually observe the position of the tell-tails on both sides of the sail in order to determine whether laminar airflow is in fact being achieved. Therefore, a need exists for a simple means of determining the existence of laminar airflow on both sides of a sail or airfoil which can be easily observed by a single individual sailing a boat. In addition a need exists for a device to indicate laminar airflow to a sailor which gives a direct reading of the existence of a laminar flow and which does not depend on extensive instrumentation or complicated measurement devices which may break down under the stringent conditions of the sea or which may be too complicated or cumbersome for a single individual to manipulate during actual sailing.

Also, a need exists for a means for determining laminar airflow across a sail or other airfoil which can be observed by a user in bad weather or at night and which permits the determination of laminar airflow from a distance.

OBJECTS OF THE INVENTION

Therefore, it is an object of the present invention to provide a means for determination of laminar airflow across an airfoil which can be observed by a user in the dark or during bad weather or from across the distance commonly encountered in various size sailing craft.

Another object of the invention is to provide a simple means of determining laminar airflow across a sail or other airflow.

Still another object of the present invention is to provide a means for a determination of laminar airflow across a sail which is at a distance from the sailor and which determination can be communicated to the sailor by transmission of a signal from the laminar airflow detection means to a display console proximate to the sailor.

These objectives and advantages are obtained by the attachment of a tell-tail to a tell-tail orientation sensor on a rotatable axis so that the movement of the tell-tail between laminar airflow and disturbed airflow rotates the sensor on the axis and the change in sensor position with respect to the axis is detected and transmitted to a display, such as a light, which is observable by sailor.

The foregoing and other objects are not meant in a limiting sense, and will be readily evident upon a study of the following specification and accompanying drawings comprising a part thereof. Other objects and advantages will become apparent from the following description taken in connection with the accompanying drawings, wherein is set forth by way of illustration and example, and embodiment of this invention.

BRIEF DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

FIG. 4 shows an embodiment of the present invention which is designed for direct observation by a sailor and which can be attached directly to a sail to indicate non-laminar airflow or a laminar airflow through a lighting of an LED;

FIG. 5 shows a sensor device which is utilized in one embodiment of the present invention and which detects the positioning of the tell-tail in either the null, or straight out position commensurate with laminar airflow, or the upwardly or downwardly directed position of the tell-tail which corresponds to non-laminar airflow and having a light reflectance-type detector, FIG. 5a shows a sensor device which is utilized in another embodiment of the present invention and which detects the positioning of the tell-tail in either the null, or straight out position commensurate with laminar airflow, or the upwardly or downwardly directed position of the tell-tail which corresponds to non-laminar airflow and having a light transmission-type detector, FIG. 6 shows an alternative embodiment of the present invention in schematic form and showing the sensor with the tell-tail attached the position of which is determined by the detector and a signal from which is then communicated to a distant display module in the vicinity of a sailor;

DETAILED DESCRIPTION

Figure 1:
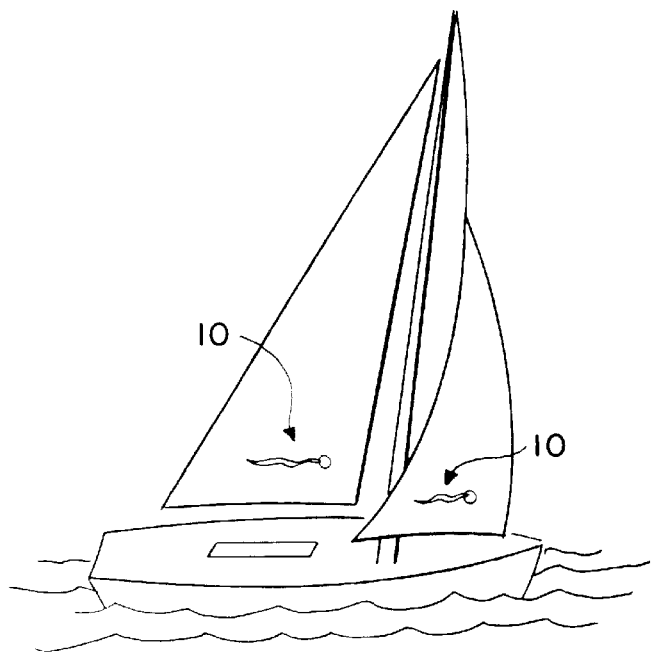
FIG. 1 is a perspective view of a sailing craft having a jib and mainsail and which is provided with laminar airflow indicators or tell-tails attached to the sails.

As has been previously discussed in the foregoing background of the invention and description of the drawings, it is a useful ability for the sailor of a boat to determine whether or not laminar airflow has been achieved on both sides of a sail. Several hurdles to this determination have been discussed previously and include the inability of the sailor to actually see the tell-tail or laminar airflow sensor which is attached to the sail due to distance from the tell-tail, or darkness, or foul weather, or having the view of the sail obstructed. The invention which is described hereinafter provides a device and method for sensing laminar airflow and disturbed airflow across a sail and displaying that information to a sailor who is on one side or the other of a sail or is at a distance from a sail and where the actual tell-tail devices cannot be directly observed.

Referring now to FIG. 4, a first embodiment of a device for detecting the position of a tell-tail is shown. Airflow unit 40 is comprised of a housing 42 which contains a battery or power source 44. Housing 42 is provided with positive lead 45 and negative lead 46 to access power source 44. Power source 44 provides energy to detector 52 (FIG. 5) and to display light or diode 47. Extending from one end of airflow unit 40 is tell-tail 48 which is attached to tell-tail orientation sensor 49. Tell-tail 48 may be composed of any lightweight material such as cloth, strong paper, nylon or other material which is capable of being caught and lifted by passing wind. The material for use in such tell-tails has long been known in the sailing art and anyone with ordinary skill will be able to supply alternative materials suitable for operating as tell-tail 48.

Tell-tail 48, as previously described, is attached to tell-tail orientation sensor 49. Sensor 49 is rotatable on a central axis 53 and movement of tell-tail sensor 49 about axis 53 is initiated by wind or air currents catching and repositioning tell-tail 48. As tell-tail 48 moves in response to wind across the sail or airfoil it rotates sensor 49 about axis 53. This rotation of sensor 49 about axis 53 can be observed and detected through the application of various types of detection means to sensor 49. It will be appreciated by those skilled in the art that the sensing of the rotation of sensor 49 about axis 53 can be accomplished through optical means, including both reflective and transmissive methods, mechanical means, electromechanical means and variable capacitance means.

In FIG. 5 a reflectance form of detector is shown. In the reflectance form of detection, as sensor 49 rotates about axis 53 in a first direction indicated by Arrow A variable reflectance disks 55a, 55b, and 55c are positioned within detector 52. If on the other hand, sensor 49 rotates in the other direction indicated by Aarrow A, variable reflectance areas 56a, 56b, 56c will be positioned under detector 52. As reflective disks 55a, 56a are only one-half as reflective as reflective disks 55b, 56b and which are, in turn, one-half as reflective as reflective 55c, 56c, detector 52 is presented with a reflected light signal which varies in intensity with the degree to which tell-tail 48 has rotated sensor 49 away from the null or zero position which is shown in FIG. 5.

Figure 2:
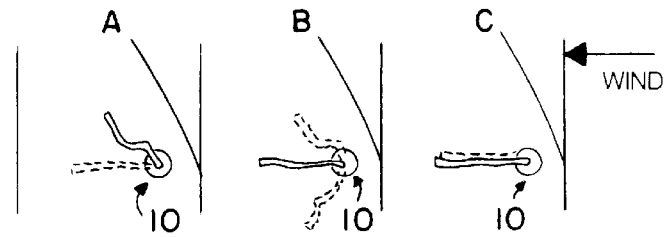
FIG. 2a shows laminar airflow on the far side of a sail with the tell-tail shown in phantom lines and disturbed or non-laminar airflow on the near side of the sail.
FIG. 2b shows a tell-tail on the near side of the sail which is being directed rearwardly by laminar airflow on the near side of the sail and showing disturbed airflow or non-laminar airflow on the far side of the sail with the tell-tail being directed upwardly due to the non-laminar airflow.
FIG. 2c shows tell-tails on the far side and near side of a sail being directed rearwardly by laminar airflow on both sides of the sail.
Figure 3:
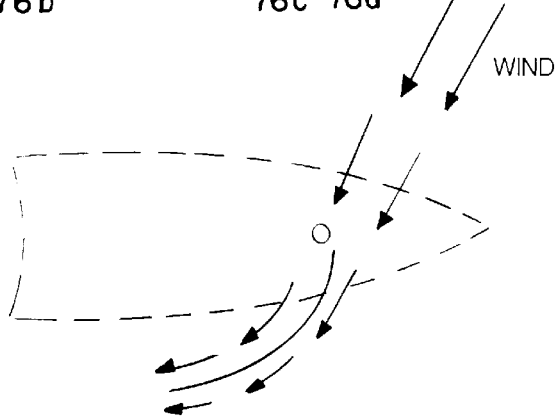
FIG. 3 is a plan view of a sailboat with the hull of the boat shown in phantom lines and showing a mainsail extended from a mast with arrows indicating the flow of air over the sail and producing the effect identified herein as laminar airflow.

The cause of sensor 49 rotation about axis 53 in the direction of Arrow A will be appreciated by a comparison of the various positions of tell-tail 48 identified in FIG. 2a, 2b, 2c with the location of reflective disks 55, 56 on orientation sensor 49. Referring now to FIG. 2 it will be appreciated that, depending upon the type of airflow across the sail or airfoil, tell-tail 48 will be directed into different positions by the passing wind or air and in turn this will position sensor 49 into different rotational locations along Arrow A (FIG. 5). For example when tell-tail 48 is held straight back (FIG. 2c) by the laminar flow of air across the sail or airfoil (FIG. 3), orientation sensor 49 will be held in the position shown in FIGS. 2c, 4, 5 and 5a wherein detector 52 is not receiving any reflectance of light (FIG. 5), or transmission of light (FIG. 5a). In the particular situation shown in FIGS. 4, 5 and 5a— where the tell-tail is held straight back as a result of the laminar flow across the sail— detector 52 is in the null position and no signal is being sent to any attached display or detector. In this case, when laminar airflow was achieved, no light would be emitted from light-emitting diode or LED 47. Alternatively, it will be appreciated by those skilled in the art, the relationship could be altered so that LED 47 received a signal when detector 52 was in the null position of in FIGS. 4, 5 and 5a and that the movement of sensor 49 about axis 53 as shown by Arrow A to position the various different reflective surfaces 55, 56 in front of detector 52 would result in a change in the output which would be translated into a weakening of the light emitted from light or LED 47. However, in the situation being described, when airflow is so disrupted (FIG. 2) that reflective disk 55C or 56C is positioned at detector 52, there would be current to light 47 and the LED would signal the sailor that corrections in the trim of the sail are required to bring the sail back into a laminar airflow situation.

Referring now to FIG. 5a, the situation in which light transmission is used as the detection method on sensor 49 will be discussed. In this method tell-tail 48 holds the in the null position when laminar airflow is achieved. This state is shown in FIG. 5a and detector 52' is in a position in which light transmission through sensor 49 is blocked. However, when disturbed airflow is present, tell-tail 48 rotates sensor 49 about axis 53 and opening 55' or opening 56' is placed within detector 52'. Opening 55', 56' in sensor 49 allows the transmission of light across detector 52' and the diode 47 (FIG. 4) is switched off to signal the sailor of the disrupted air position.

Again referring to FIG. 5, mechanical detection means may be employed for determining the position of sensor 49 on axis 53. In one such situation, a spring is simply attached to axis 53 and as axis 53 rotates in the direction of Arrow A the spring is variably compressed against a pressure detection sensor (not shown). This change in pressure against the sensor can be used to signal when orientation sensor 49 has deviated from the null position. Any deviation from the null position would place either reduced or increased pressure on the pressure sensor which could be translated into illuminating or extinguishing light or LED 47 to signal the sailor.

Yet another manner of detecting movement of sensor 49 about axis 53 is by application of the shaft encoder method to sensor 49. In this method, wedge-shaped sectors of sensor 49 are each coded with a unique digital pattern which is then read by detector 52 when that sector is positioned in front of the detector 52. Upon recognition of the presence of a particular sector within the detector, the detector transmits the proper related signal which is associated with that sector or digital pattern. In this manner, the detector can detect the specific variable degrees by which the sail has lost laminar flow and present that information to the sailor.

Figure 7:
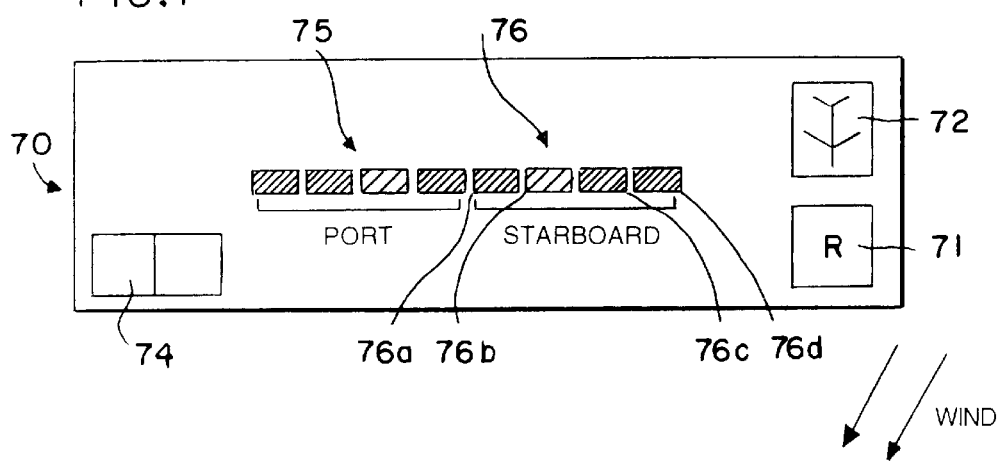
FIG. 7 is a diagram of a distant display module panel which can indicate to the sailor the side of the sail which does not present laminar airflow and the degree of non-laminar airflow presented on that side of the sail.

Referring now to FIG. 7 a more advanced display is presented which can be used with the shaft encoder detector method to constantly display the air conditions of the sail to the sailor. When laminar airflow is present light 76a is constantly illuminated. As laminar airflow is lost the illumination of the lamps shifts through lamp 76b to 76c and finally to 76d. These lamps are each differently colored and through the use of the shaft encoder detector method each lamp 76a–d can be related to a different type of airflow and can be continuously illuminated while that sector of sensor 49 is in front of the detector. When the sector changes, a different lamp is then continuously lit by the detector. In this manner a sailor can constantly be informed of the airflow conditions on both sides of a sail as shown by the port lights 75 and the starboard lights 76 on the display of FIG. 7.

Another alternative means of sensing the rotation of sensor 49 about axis 53 can be accomplished through the use of a resistance wire sensor wherein a resistance wire is attached to axis 53 and as the axis rotates or as sensor 49 rotates about axis 53 the resistance wire is shortened or lengthened and the measured change of electrical resistance through the wire indicates movement of sensor 49 off of the null position.

Yet another means of identifying when sensor 49 has moved off of the null position thereby indicating that laminar airflow has been lost could be accomplished through the use of a simple open or closed circuit wherein an electrical contact between a portion of sensor 49, and an electrical contact attached to housing 42 of airflow unit 40 creates either an open or closed circuit when they are aligned. Alignment could occur at the instance when laminar flow is achieved and orientation sensor 49 is in the null position. In this instance the circuit would be completed and the LED or light 47 display light would be activated to show that laminar airflow was present.

Yet another means of signaling rotation of sensor 49 would be to use a variable capacitance method in which one plate of the capacitor rotates as sensor 49 moves about axis 53 thereby creating a change in capacitance which would signal the movement of tell-tail orientation sensor 49 away from a null position to indicate that laminar airflow was no longer achieved across the sail.

It will be clear to those skilled in the art that variations on the above-identified means for determining rotation of sensor 49 about an axis can be applied to this situation. However, such variations are intended to be encompassed by the present invention as stated in the claims appended hereto, and including all equivalent mechanical, electromechanical, and optical means of monitoring the change in position of sensor 49 about a central axis.

Again referring to FIG. 4, the attachment of airflow unit 40 to a sail will be discussed. Airflow unit 40 is a small, light-weight unit having dimensions of approximately 5 centimeters by 2½ centimeters. Housing 42 is a light-weight epoxy material which seals all electronic components and protects them from the intrusion of moisture. The attachment of airflow unit 40 to a sail can be accomplished by use of a hook and pile connector such as VELCRO® or by sewing housing 42 to the sail or by gluing housing 42 to a sail. Yet another method of attaching housing 42 to a sail which is quick and easy and removable, is to provide a magnet on the backside of housing 42 and then positioning a second magnet or a second airflow unit 40 on the other side of the sail from a first unit and relying on magnets of opposing pole to maintain a secure connection between the two airflow units 40 with the sail interposed therebetween.

Referring now to FIG. 6, an alternative embodiment of the airflow unit of the present invention is shown having included therein a transmitter and antennae and signal encoder so that the detected position of the orientation sensor can be sent to the attention of a sailor who is at some distance from the particular sail on which the airflow unit is measuring laminar or disturbed airflow.

In the embodiment of FIG. 6, the tell-tail 48 and tell-tail orientation sensor operate as previously described and the changes in position of orientation sensor 49 are determined by detector 62 which is encased within housing 60. The detection of changes in position of tell-tail orientation sensor 49 (FIG. 6) operates in one of the various fashions as has been previously discussed for the embodiment presented in FIG. 4. In the case of the embodiment of FIG. 6, however, it is the intention that the detected signal be transmitted to a display located at some distance from the actual housing 60. The transmission of the detected signal is accomplished by sending the signal from detector 62 to a transmitter 66 which then transmits the signal by way of antenna 68 to a distant receiver. The power source for the components shown in FIG. 6 is battery 64. Also shown in FIG. 6 is encoder 64. Encoder 64 is utilized to provide a unique frequency code to the signal from detector 62 so that the signal sent from one such airflow unit 61 to a distant transmitter will not be confused with the signal being transmitted from a similar airflow unit 61 located on the opposite side of the sail, or even on an adjacent boat.

Referring now to FIG. 7 a typical display unit is shown which receives the signal from transmitter 68 of airflow unit 61. Display 70 is provided with receiver 71 and antenna 72 which receive the signal from airflow unit 61 and provide it to display lights 75, 76 depending on which signal is received. It will be appreciated by those skilled in the art that display 75, 76 could be a simple on-off type of light, analog display, computer screen display or any other type of display means to indicate laminar or disturbed airflow as received by the orientation sensor 49 of airflow unit 61. An alternative form of display is shown in FIG. 7 wherein the intensity of the signal which corresponds to the degree to which disturbed airflow is occurring across the sail is displayed through the use of a series of differently colored lights. When laminar airflow is achieved and orientation sensor 49 of unit 61 is in the null position, no signal is transmitted and light 76a remains illuminated. As tell-tail 48 changes position and moves orientation sensor 49 into various different positions as have been previously identified in the discussion of FIG. 5, the intensity of the signal transmitted to display unit 70 will increase and light, in turn, lamps 76b, 76c, and finally 76d. It will be appreciated by those skilled in the art that this same effect may be achieved through means other than simple signal intensity. For instance, the detector 62 may convert the different light reflection or absorption from reflective disks 55, 56 or a pattern on orientation sensor 49 into discreet digital binary code which are then transmitted and provide the signal to light a specific lamp 76a, or 76b, or 76c or 76d. In this manner, only a signal lamp is lit at a time thereby providing a specific indication of the degree to which laminar airflow has been lost across the sail.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the improved Laminar Airflow Detector is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What I claim as useful and desire to be protected by Letters Patent is:

1. An apparatus for detection of air and gas laminar flow across a surface comprising:

an airflow pick-up responsive to the passage of gas across a sail or airfoil, an orientation sensor attached to said airflow pick-up, said sensor being rotatable about an axis to indicate the orientation of said pick-up with respect to said axis as said pick-up changes position in response to the passage of gas across the surface, a detector for determining the position of said orientation sensor with respect to said axis, and a display for communicating to a user the detected position of said orientation sensor so that the user can determine the existence of laminar airflow on the surface.

2. The apparatus as claimed in claim 1 wherein said detector operates by the transmission of light through differential density segments on said sensor.

3. The apparatus as claimed in claim 1 wherein said detector operates by the reflectance of light from differentially reflective portions located on said sensor.

4. The apparatus as claimed in claim 1 wherein said detector operates by the determination of change in capacitance of a capacitor attached to said sensor.

5. The apparatus as claimed in claim 1 wherein said detector operates by detecting the operating state of an electrical circuit interconnected to said sensor.

6. The apparatus as claimed in claim 1 wherein said detector detects the position of said orientation sensor by reading a pattern encoded on each of a plurality of segments on said sensor.

7. An apparatus for detection of air and gas laminar flow across a surface comprising:

an airflow pick-up responsive to the passage of gas across a sail or airfoil, an orientation sensor having said airflow pick-up attached thereto, said sensor being rotatable about an axis for indicating the orientation of said airflow pick-up with respect to said axis as said pick-up responds to said passage of gas across the surface, a detector for determining the position of said orientation sensor with respect to said axis, a transmitter for sending the determined position of said sensor by said detector to a receiver, and a display for communicating to a user the detected position of said orientation sensor so that the user can determine the existence of laminar airflow on the surface.

8. The apparatus as claimed in claim 7 further comprising a signal encoder for specifically identifying the transmitted detected position signal prior to transmission to said receiver.

9. The apparatus as claimed in claim 7 wherein said detector operates by the transmission of light through differential density segments on said sensor.

10. The apparatus as claimed in claim 7 wherein said detector operates by the reflectance of light from differentially reflective portions located on said sensor.

11. The apparatus as claimed in claim 7 wherein said detector operates by the determination of change in capacitance of a capacitor attached to said sensor.

12. The apparatus as claimed in claim 7 wherein said detector operates by detecting the operating state of an electrical circuit interconnected to said sensor.

13. The apparatus as claimed in claim 7 wherein said detector detects the position of said orientation sensor by encoding a plurality of segments on said sensor with a pattern for reading by said detector.

* * * * *